(12) United States Patent  (10) Patent No.: US 9,314,964 B2
Brauch  (45) Date of Patent: Apr. 19, 2016

(54) COMPOSITE COMPONENT AND PROCESS FOR PRODUCING A COMPOSITE COMPONENT

(71) Applicant: Bayerische Motoren Werke Aktiengesellschaft, Munich (DE)

(72) Inventor: Michael Brauch, Baldham (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/301,915

(22) Filed: Jun. 11, 2014

(65) Prior Publication Data

US 2014/0295155 A1 Oct. 2, 2014

Related U.S. Application Data (63) Continuation of application No. PCT/EP2012/075017, filed on Dec. 11, 2012.

(30) Foreign Application Priority Data

Dec. 12, 2011 (DE) .......................... 10 2011 088 286

(51) Int. Cl.
*B29C 65/54* (2006.01)
*B29C 65/02* (2006.01)
(Continued)

(52) U.S. Cl.
CPC ............... *B29C 65/02* (2013.01); *B29C 44/128* (2013.01); *B29C 44/1242* (2013.01);
(Continued)

(58) Field of Classification Search
CPC ............ B29C 44/1242; B29C 44/1247; B29C 44/128; B29C 44/18; B29C 44/188; B29C 65/54; B29C 65/542; B29C 66/52271; B29C 66/52272; B29C 66/70; B29C 66/71; B29C 66/712; B29C 66/721; B29C 66/7212; B29C 66/7422; B29C 66/74283; B62D 29/002
USPC ................... 156/77, 78, 79, 292, 294
See application file for complete search history.

(56) References Cited

U.S. PATENT DOCUMENTS 5,866,052 A * 2/1999 Muramatsu .................. 264/46.6
6,474,726 B1 11/2002 Hanakawa et al.
(Continued)

FOREIGN PATENT DOCUMENTS

DE 196 32 550 A1 2/1998
DE 0 897 439 T1 6/1999
(Continued)

OTHER PUBLICATIONS

German Search Report dated Oct. 11, 2012, with English translation (Ten (10) pages).
(Continued)

*Primary Examiner* — Michael Tolin
(74) *Attorney, Agent, or Firm* — Crowell & Moring LLP (57) ABSTRACT

A process is provided for producing a composite component having a first component element and a second component element, which are connected with one another by an adhesive connection. The process includes forming an adhesive cavity by applying thermally active plastic material to an adhesive connection side of the first component element and/or to an adhesive connection side of the second component element; arranging the first component element on the second component element, wherein a gap is formed between the adhesive connection side of the first component element and the adhesive connection side of the second component element, and supplying heat in such a manner that the thermally active plastic material expands and forms a boundary in the gap between the first component element and the second one. The process further fills the formed adhesive cavity with an adhesive for the permanent connection of the first component element with the second component element.

13 Claims, 5 Drawing Sheets

(51) Int. Cl.
*B29C 44/12* (2006.01)
*B29C 44/18* (2006.01)
*B29C 65/00* (2006.01)
*B29C 65/78* (2006.01)
*B32B 7/12* (2006.01)
*B29L 31/30* (2006.01)

(52) U.S. Cl.
CPC .......... *B29C 44/1247* (2013.01); *B29C 44/188* (2013.01); *B29C 65/54* (2013.01); *B29C 65/7826* (2013.01); *B29C 66/004* (2013.01); *B29C 66/1312* (2013.01); *B29C 66/324* (2013.01); *B29C 66/43* (2013.01); *B29C 66/52272* (2013.01); *B29C 66/547* (2013.01); *B29C 66/712* (2013.01); *B29C 66/721* (2013.01); *B32B 7/12* (2013.01); B29C 65/542 (2013.01); *B29C 66/7212* (2013.01); *B29C 66/742* (2013.01); *B29C 66/74283* (2013.01); *B29L 2031/3055* (2013.01); *Y10T 428/24942* (2015.01); *Y10T 428/31678* (2015.04)

(56) References Cited

U.S. PATENT DOCUMENTS

| | | | |
|---|---|---|---|
| 6,561,562 | B1 | 5/2003 | Hesch |
| 6,941,719 | B2 * | 9/2005 | Busseuil et al. ................ 52/846 |
| 7,097,794 | B2 * | 8/2006 | McLeod et al. .............. 264/46.5 |
| 7,141,194 | B1 | 11/2006 | Beckmann |
| 2003/0194548 | A1 * | 10/2003 | McLeod et al. ............ 428/304.4 |
| 2004/0217498 | A1 | 11/2004 | Ondrus et al. |
| 2010/0092733 | A1 | 4/2010 | Blank et al. |

FOREIGN PATENT DOCUMENTS

| | | |
|---|---|---|
| DE | 102 38 667 A1 | 4/2004 |
| DE | 600 23 405 T2 | 8/2006 |
| DE | 10 2007 010 341 A1 | 7/2008 |
| FR | 1 114 386 A | 4/1956 |
| WO | WO 99/48746 A1 | 9/1999 |

OTHER PUBLICATIONS

International Search Report (PCT/ISA/210) dated Apr. 26, 2013, with English translation (Six (6) pages).

* cited by examiner

COMPOSITE COMPONENT AND PROCESS FOR PRODUCING A COMPOSITE COMPONENT

CROSS REFERENCE TO RELATED APPLICATIONS

This application is a continuation of PCT International Application No. PCT/EP2012/075017, filed Dec. 11, 2012, which claims priority under 35 U.S.C. §119 from German Patent Application No. 10 2011 088 286.3, filed Dec. 12, 2011, the entire disclosures of which are herein expressly incorporated by reference.

BACKGROUND AND SUMMARY OF THE INVENTION

The present invention relates to a composite component and to a process for producing a composite component having a first component element and a second component element, the first component element and the second component element being connected with one another by an adhesive connection. The composite component may be a supporting part of a motor vehicle body.

It is known to arrange a structural element, i.e. a reinforcing element, in an area between an outer and an inner shell, particularly in the case of a motor vehicle body in its shell construction. In this case, the structural element may consist of a fiber-reinforced plastic material, such as a carbon-fiber-reinforced plastic, while the inner and/or outer shell may consist of steel. The structural element is connected with the outer and/or inner shell by way of a connecting adhesive as a result of an area connection. Such a component in the shell construction having a structural element is described in German Patent Document DE 102007010341 A1.

It is now an object of the present invention to create a composite component and a process for producing a composite component having a first component element and a second component element which are connected with one another by an adhesive connection, which permits a simple formation of locally limited adhesive points.

This and other objects are achieved by a process according to the present invention for producing a composite component having a first component element and a second component element, which are connected with one another by an adhesive connection. The process includes the steps of forming an adhesive cavity with the following substeps:
applying a thermally active plastic material to an adhesive connection side of the first component element and/or to an adhesive connection side of the second component element,
arranging the first component element on the second component element, a gap being formed between the adhesive connection side of the first component element and the adhesive connection side of the second component element, and
supplying heat such that the thermally active plastic material expands and forms a boundary in the gap between the first component element and the second one. The process further has the step of filling the formed adhesive cavity with an adhesive for the permanent connection of the first component element with the second component element.

The adhesive cavity forms a locally limited adhesive point or adhesive connection point between the first component element and the second component element. After its expansion, the thermally active plastic material forms a wall extending in the gap between the first component element and the second component element. The gap is a space between the first component element and the second component element.

Several adhesive cavities and therefore adhesive points may be formed in the composite component.

By the process according to the invention, the first component element and the second component element can be connected in a simple manner at a previously defined local point by use of an adhesive connection. In addition, this process makes it possible to create locally limited adhesive connections. As a result, adhesive is applied only to locally limited points, i.e. to local adhesive points. It is therefore not necessary to fill the entire gap between the first component element and the second component element with adhesive. This saves material, weight and costs. In addition, by supplying heat, the present process makes it possible that the second component element is prefixed at the first component element by the expansion of the thermally active plastic material. This has the advantage that the first component element with the second component elements can pass through further processes until the actual adhesive connection for connecting the second component element with the first component element is established. This is particularly advantageous when the first component element and the second component element jointly have to pass through process steps anyhow, which require a heating of the first component element together with the second component element. However, such a heating of the second component element with the first component element with the completely formed adhesive connection would be disadvantageous because an adhesive connection is thermally stable only within certain limits.

In the case of the process according to the invention, the first component element is preferably constructed of a first material and the second component element is constructed of a second material. The first material and the second material are different materials.

In particular, the first material and the second material have different thermal coefficients of linear expansion.

In the case of two materials with different coefficients of linear expansion, it is especially advantageous to create an adhesive connection which is more elastic than a connection by means of mechanical, form-fitting connection devices, for example such as bolts, screws or rivets.

Particularly preferably, the first material is made of plastic and the second material is made of metal. In the case of this pairing of materials, the problem of different coefficients of linear expansion occurs in many cases, which, however, can be solved in an appropriate manner by means of the present invention.

Naturally other pairings of materials, which are formed of the first material and the second material, are also contemplated. For example, the first component element may consist of steel, aluminum or plastic, for example, fiber-reinforced plastic. The second component element may, in turn, consist of aluminum, plastic, for example, fiber-reinforced plastic, steel or magnesium.

Preferably, the thermally active plastic material is further applied such that the thermally active plastic material, at least after the step of the supplying of heat, during which the thermally active plastic material expands, forms a closed boundary in the gap.

The thermally active plastic material can thereby be applied with interruptions, in which case these interruptions can be closed by the expansion of the thermally active plastic material when heat is supplied and can therefore form a closed bead.

As an alternative, the thermally active plastic material can already during the application be constructed in the shape of a closed bead, which forms the boundary.

According to the present invention, in the "supplying of heat" step, process heat is further supplied during a coating step of the composite component.

In particular, the heat is process heat which is necessary for drying the coating, and which is additionally used for the supplying of heat in order to activate the thermally active plastic material.

Thus, on the one hand, the process heat can be used for pre-fixing the second component element on the first component element, and, on the other hand, the filling of the adhesive cavity with adhesive can be carried out after the supplying of process heat, so that the process heat for drying the coating has no disadvantageous effect with respect to the adhesive connection.

The coating is preferably applied to the composite component in a dip coating process. However, other coating processes are also contemplated in connection with the present invention.

The first component element preferably is a hollow section, and the second component element is a reinforcing element which is arranged inside the hollow section. In this case, during the step of forming the adhesive cavity, the thermally active plastic material is applied to an exterior side of the reinforcing element and/or to an interior side of the hollow section.

The hollow section may further consist of a first hollow section component and a second hollow section component.

This facilitates an insertion of the reinforcing element into the hollow section. For example, the reinforcing element can first be inserted into the first hollow section component, and subsequently, the second hollow section component can be joined to the first hollow section component.

The hollow section may also consist of more than two hollow-section components.

In the "arranging of the reinforcing element in the hollow section" step, the reinforcing element is preferably arranged in the first hollow-section component, and then the first hollow-section component is connected with the second hollow-section component.

Particularly preferably, the composite component is a supporting part of a motor vehicle body.

The first component element, for example, the hollow section, and the second component element, for example, the reinforcing element, may have arbitrary shapes and cross-sections. When the composite component is, for example, used in a motor vehicle body, the first component element and the second component element may have the shapes and cross-sections customary there in order to meet requirements with respect to rigidity and stability.

The thermally active plastic material according to the present invention may by a permanently elastic foam, for example, of ethylene vinyl-acetate or ethylene butyl-acrylate.

A composite component according to the present invention has a first component element and a second component element which are connected with one another by way of an adhesive connection. A gap is formed between the first component element and the second component element, in which gap at least one locally limited adhesive cavity is formed, which is bounded by an adhesive connection side of the first component element, an adhesive connection side of the second component element as well as at least one wall of thermally activated plastic material. The adhesive cavity is filled with an adhesive for the permanent connection of the first component element with the second component element.

The gap is a space between the first component element and the second component element.

The composite component may be further developed as explained in connection with the process for producing a composite component.

Other objects, advantages and novel features of the present invention will become apparent from the following detailed description of one or more preferred embodiments when considered in conjunction with the accompanying drawings.

DETAILED DESCRIPTION OF THE DRAWINGS

First, a process is described according to a first embodiment of the present invention for producing a composite component 1 consisting of a hollow section 3, which forms a first component element, for example, made of a metallic material, and a reinforcing element 5, which forms a second component element, for, example, made of a fiber-reinforced plastic material. The hollow section 3 and the reinforcing element 5 have linear expansion coefficients with a constructively relevant difference.

The composite component according to the first embodiment is part of a motor vehicle body. In particular, the composite component is a supporting part of the motor vehicle body, which has a function for reinforcing the vehicle body as well as a function for absorbing energy in the case of a load.

Figure 1:
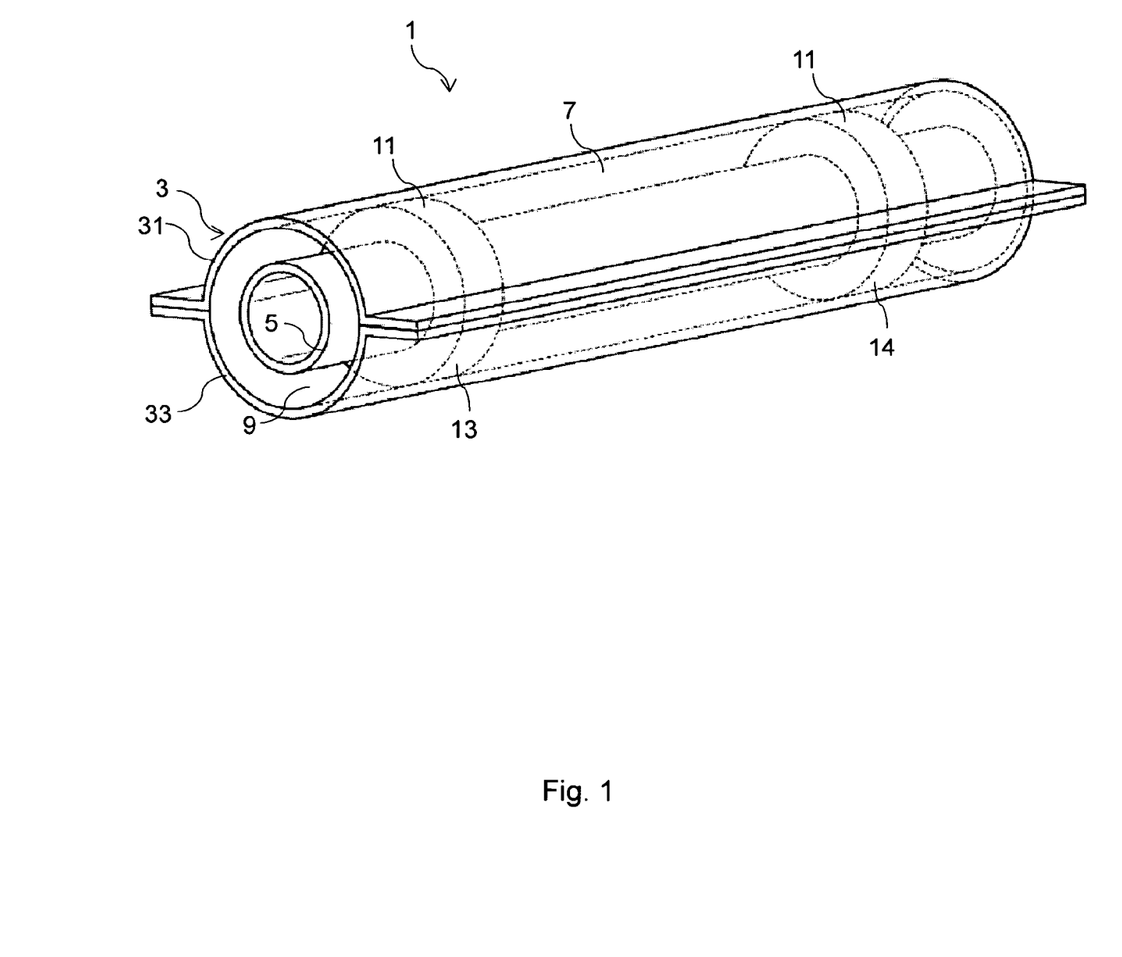
FIG. 1 is a schematic perspective view of a composite component according to a first embodiment of the present invention with a first variant of an adhesive cavity.

FIG. 1 is a schematic perspective view of the composite component 1 according to the first embodiment of the present invention with a first variant of an adhesive cavity 7. The reinforcing element 5 is a circular-cylindrical hollow rod, for example, made of a fiber-reinforced plastic material. The reinforcing element 5 is arranged in the hollow section 3, which consists of a first and a second hollow-section component 31, 33 connected with another by means of flanges and together forming a circular-cylindrical cavity or gap 9. The adhesive cavity 7 is formed between the hollow section 3 and the reinforcing element 5. The adhesive cavity 7 is situated in the gap 9 formed between the hollow section 3 and the reinforcing element 5. The adhesive cavity 7 is bounded by the hollow section 3, the reinforcing element 5, a first ring 13 and a second ring 14. The first and second rings 13, 14 are made of a thermally activated plastic material 11. The thermally activated plastic material 11 consists of a foamed plastic material, which completely fills in a width of the gap 9, i.e. a distance between the hollow section 3 and the reinforcing element 5. An adhesive is injected in the adhesive cavity 7, the adhesive not being shown in FIG. 1. In the present embodiment, a permanently elastic foam of ethylene vinyl-acetate or ethylene butyl-acrylate is used as the thermally active plastic material. However, another suitable thermally active plastic material may also be used.

Figure 2:
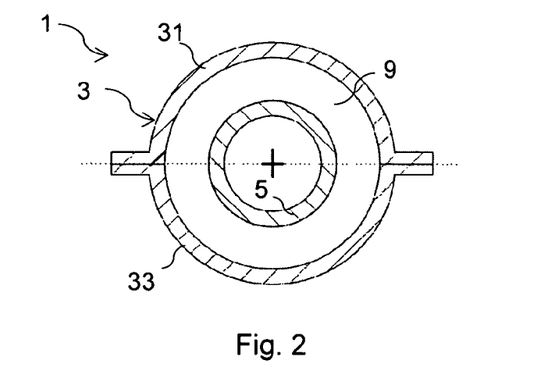
FIG. 2 is a schematic sectional view of a hollow section of the composite component according to the first embodiment of the present invention, in which a reinforcing element is arranged.

FIG. 2 is a schematic sectional view of the hollow section 3 in which the reinforcing element 5 is arranged. The ring-shaped gap 9 is illustrated between the hollow section 3 and the reinforcing element 7. In the condition of FIG. 2, no adhesive or thermally active or thermally activated plastic material is present in the gap 9.

In the following, a process for producing the composite component 1 illustrated in FIG. 1 according to the first embodiment of the present invention will be described in detail.

The adhesive cavity 7 is formed first. For this purpose, thermally active plastic material 11 is applied at suitable points to the hollow section 3 and/or the reinforcing element 5, as will be explained in the following with respect to FIGS. 3 and 4.

Figure 3:
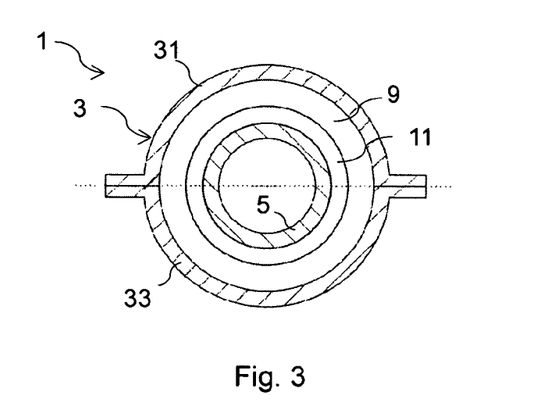
FIG. 3 is a schematic sectional view of the hollow section of the composite component according to the first embodiment of the present invention, in which the reinforcing element is arranged, in which case, thermally active plastic material is applied to the reinforcing element.
Figure 4:
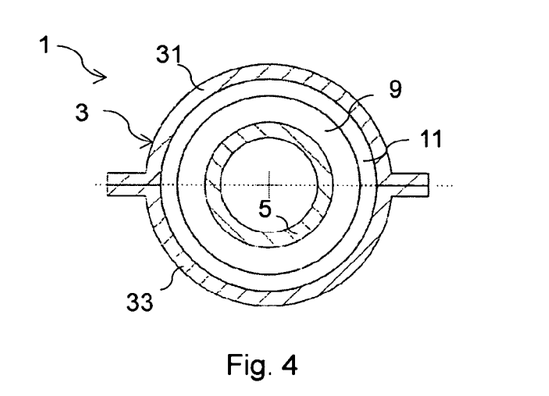
FIG. 4 is a schematic sectional view of the hollow section, in which the reinforcing element is arranged according to a modification of the first embodiment of the present invention, in which thermally active plastic material is applied to the hollow section according to a modification of the first embodiment of the present invention.

FIGS. 3 and 4 show possibilities of where the thermally active plastic material 11 can be applied according to the present embodiment. In particular, before the reinforcing element 5 is arranged in the hollow section 3, a bead of thermally active plastic material 11 will be applied to locations at which a boundary of an adhesive connection to be formed is to be established. The thermally active plastic material 11 is applied either according to FIG. 4 to an interior side of the hollow section 3 or, as a modification according to FIG. 3, is applied to an exterior side of the reinforcing element 5 in the shape of a bead. It is naturally also possible to apply the bead or parts of the bead to both hollow-section elements.

During the mutual joining of the reinforcing element 5 and of the two hollow-section components 31, 33, the thermally active plastic material 11 may already form a pre-connection between the reinforcing element 5 and the hollow-section components 31, 33, so that the position of the hollow section 3 is prefixed with respect to the reinforcing element 5.

As an alternative, the pre-connection between the hollow section 3 and the reinforcing element 5 may also be formed after an activating of the thermally active plastic material 11.

After the application of the thermally active plastic material 11, the reinforcing element 5 will then, for example, be arranged in the hollow-section component 31. The hollow-section component 33 will then be joined to the hollow-section component 31. As required, suitable spacers are used which determine a position of the reinforcing element 5 with respect to the hollow section 3, i.e. the hollow-section components 31 and 33.

In this condition, the adhesive cavity 7 is not yet completely formed. In particular, the thermally active plastic material 11 does not yet completely seal off the gap 9. Clearances may still exist which connect the adhesive cavity 7 with the remaining gap 9.

Then, the blank composite component formed in such a manner, i.e. the unfinished composite component, with the hollow section 3, the reinforcing element 5 and the not activated plastic material 11, together with the vehicle body, passes through a coating process, for example, a dip painting process. In this case, it is possible that a coating agent may penetrate into the adhesive cavity 7, because the thermally active plastic material 11 does not yet completely close the gap 9. This would not be possible if an adhesive connection had been completely formed already before the dip painting process; i.e. the coating agent could not wet the elements of the unfinished composite component in the area of the adhesive connection.

In order to fix the coating agent on the motor vehicle body and thus on the unfinished composite component, the motor vehicle body together with the component passes through a drying process with an introduction of heat, for example, a cathode dip painting process (KTL dryer). As a result of the heat present anyhow for the drying process, the motor vehicle body together with the unfinished composite component is heated to such an extent that the thermally active plastic material 11 is activated, foams and thereby expands.

The gap 9 between the hollow section 3 and the reinforcing element 5 is thereby closed at the points at which the thermally active plastic material 11 is present.

In the case of the composite component 1 illustrated in FIG. 1, an adhesive cavity 7 will then be formed by a first ring 13 and a second ring 14 made of thermally activated plastic material 11 as well as the interior side of the hollow section 3 and the exterior side of the reinforcing element 5. Furthermore, in this condition, the reinforcing element 5 is already relatively firmly fixed in the hollow section 3.

The introduction of heat in the drying process for the KTL dryer is so high that an adhesive connection already existing at this point-in-time would not survive the introduction of heat without any damage. Furthermore, in the case of the presence of a form-fitting connection by way of bolts, as a result of the different coefficients of thermal expansion of the hollow section 3 and of the reinforcing element 5, an overloading of the form-fitting connection would take place, which could be avoided only by high-expenditure constructive measures. However, the prefixing of the reinforcing element 5 at the hollow section 3 by way of the thermally activated plastic material 11, i.e. of the foamed plastic material of relatively high elasticity, permits a displacement of the reinforcing element 5 relative to the hollow section 3 as a result of its different thermal expansion.

When the motor vehicle body with the hollow section 3 and the reinforcing element 5 has passed through the coating process, particularly when the motor vehicle body has passed through the temperature-intensive processes, the actual permanent adhesive connection between the hollow section 3 and the reinforcing element 5 can be established.

As indicated by the above-described process for forming the adhesive cavity 7, the application of the thermally active plastic material has to be selected such that, as a result of a degree of expansion, an application cross-section, thus in the present embodiment, the gap 9, and a geometrical position of the elements of the unfinished composite component, the gap 9 between the hollow section 3 and the reinforcing element 5, which is to be closed, will be closed by expansion in the temperature-intensive phase of the coating process. The thermally active plastic material 11 should further be selected such that it can survive without any damage the temperature-intensive process and the resulting relative movements between the reinforcing element 5 and the hollow section 3, which consist of the materials with the different coefficients of thermal expansion. Therefore, when using the thermally active plastic material 11, the quantity, the shape of the bead and naturally the material of the thermally active material 11 are important.

For producing the adhesive connection, an adhesive will then be injected into the adhesive cavity 7. Since the adhesive cavity 7 is essentially bounded by the first ring 13, the second ring 14, the hollow section 3 and the reinforcing element 5, the space for the adhesive is limited to the adhesive cavity 7 and does not penetrate into other areas of the gap 9 between the hollow section 3 and the reinforcing element 5, which are not intended for that purpose.

For the injection of the adhesive, either a filling opening created, for example, in the hollow section 3, before the forming of the adhesive cavity 7 is used, or the filling opening is created, for example, by drilling, after the forming of the adhesive cavity 7.

Figure 5:
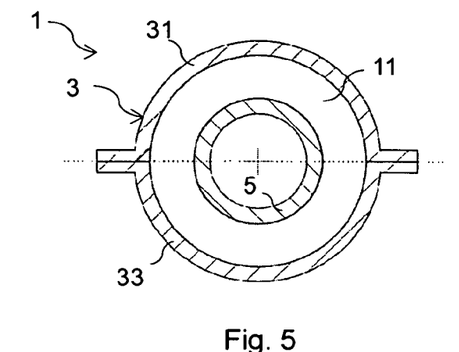
FIG. 5 is a schematic sectional view of the hollow section, in which the reinforcing element is arranged according to the first variant of the first embodiment of the present invention.

In FIG. 1, a first variant of the first embodiment is illustrated for an adhesive connection with an adhesive cavity 7 in the composite component 1. FIG. 5 is a sectional view of this first variant, the section extending through one of the two rings 13, 14.

However, the adhesive connection with the adhesive cavity 7, depending on the geometrical structure of the components of the composite component 1 and the demands on the adhesive connection, can in each case be formed in a correspondingly adapted fashion.

Further variants with respect to the adhesive connection of the composite component 1 according to the first embodiment are illustrated in FIGS. 6 to 9.

Figure 6:
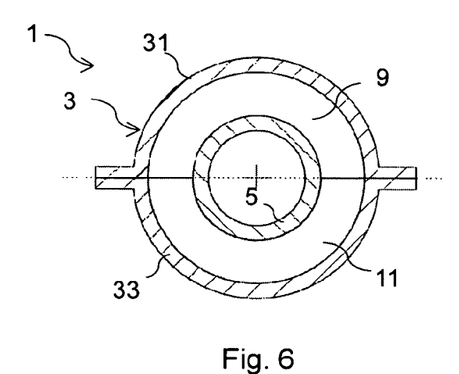
FIG. 6 is a schematic sectional view of the hollow section, in which the reinforcing element is arranged according to a second variant of the first embodiment of the present invention.

FIG. 6 is a schematic sectional view of the composite component 1 of the first embodiment with a second variant of the adhesive cavity 7. Here, the adhesive cavity 7 is formed only between the hollow-section component 31 and the reinforcing element 5. The adhesive cavity 7 is therefore not formed here along the entire circumference of the ring-shaped gap 9 but only as a sector of the ring-shaped gap 9, particularly along one half of the circumference of the ring-shaped gap 9.

Figure 7:
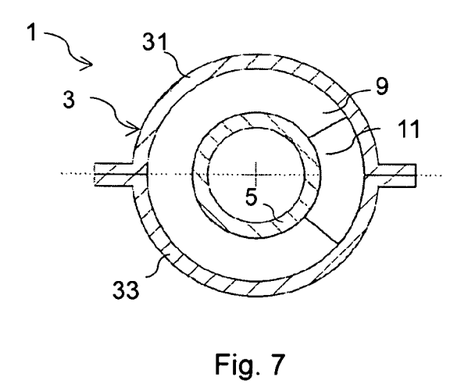
FIG. 7 is a schematic sectional view of the hollow section, in which the reinforcing element is arranged according to a third variant of the first embodiment of the present invention.

FIG. 7 is a schematic sectional view of the composite component 1 of the first embodiment with a third variant of the adhesive cavity 7. In this case, the adhesive cavity 7 is formed between the hollow-section component 33 and the reinforcing element 5, however, but not over the entire circumference of the gap 9 but over less than one fourth of the circumference of the gap 9. A sector of the ring-shaped gap 9, in which the adhesive cavity 7 of the third variant is formed, extends here over both hollow-section components 31 and 33 but not over the entire circumference of the gap 9.

Figure 8:
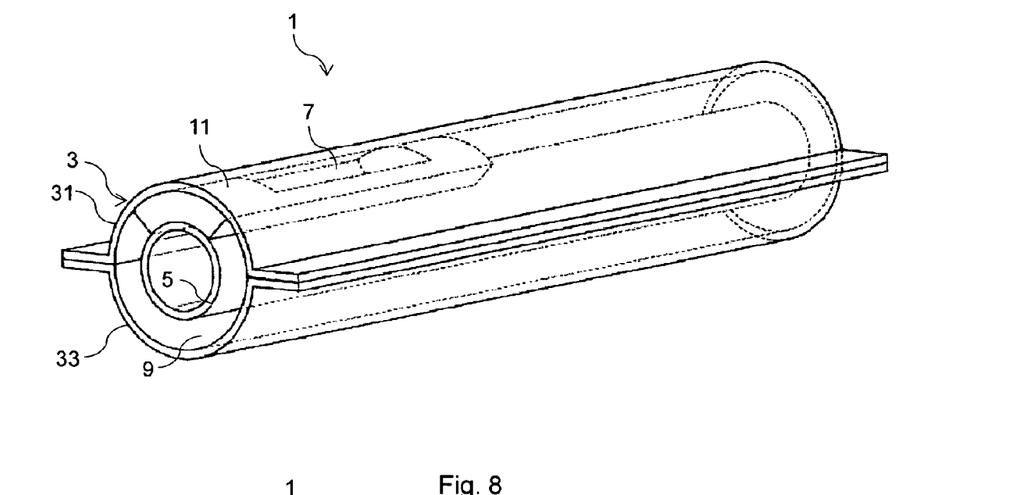
FIG. 8 is a schematic perspective view of the composite component according to the first embodiment of the present invention with a modification of the third variant of the adhesive cavity.

FIG. 8 is a schematic perspective view of the composite component 1 according to the first embodiment of the present invention with a modification of the third variant of the adhesive cavity 7. In the perspective view, it can be recognized that the thermally active plastic material 11 forms a closed bead, which extends in sections in the radial direction and in the axial direction of the reinforcing element 5 and of the ring-shaped gap 9 respectively, which is also the case in the third variant of the first embodiment of FIG. 7, but is not visible in the sectional view. In contrast to the third variant of the first embodiment of FIG. 7, the closed bead of the thermally active plastic material is formed only between the hollow-section component 31 and the reinforcing element 5.

Figure 9:
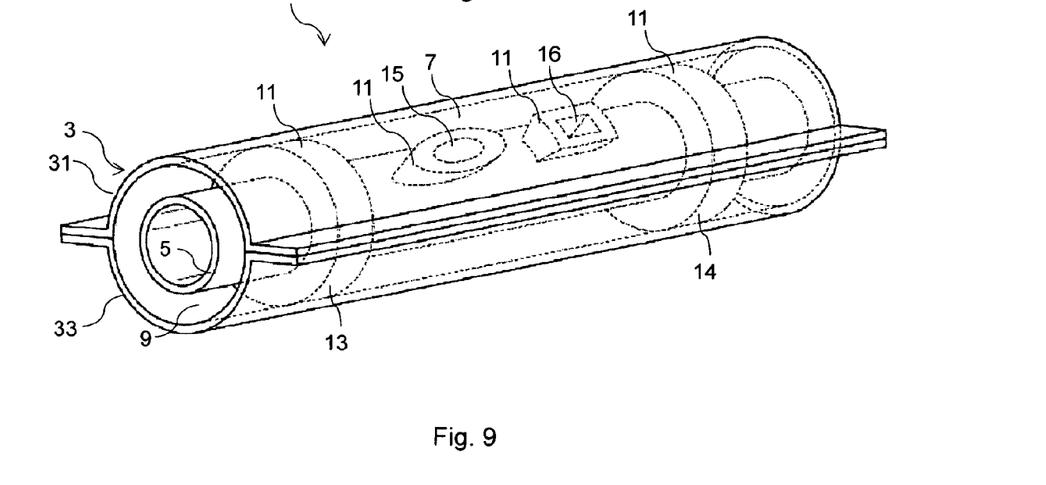
FIG. 9 is a schematic perspective view of the composite component according to a fourth variant of the first embodiment of the present invention.

FIG. 9 is a schematic perspective view of the composite component 1 according to the first embodiment of the present invention with a fourth variant of the adhesive cavity 7. In the perspective view, it can be recognized that the thermally active plastic material has formed two rings 13, 14. To this extent, the fourth variant of the first embodiment corresponds to the first variant (see FIG. 1) of the first embodiment. The adhesive cavity 7 of the fourth variant has additional recess sections 15, 16 in the adhesive cavity 7. The recess sections 15, 16 are formed by means of boundaries made of thermally active plastic material 11 such that, when adhesive is injected into the adhesive cavity 7, the recess sections 15, 16 are not filled with adhesive. The recess section 15 has an oval shape, while the recess section 16 has an angular shape. Any other shape of the recess section is possible.

In the present first embodiment, the hollow section 3 and the reinforcing element 5 have a tube-shaped construction. This is used only for a simpler explanation of the principle of the invention. Naturally, the hollow section 3 and the reinforcing element 5 may also have different shapes and cross-sections of complicated geometrical shapes customary in motor vehicle body construction. Furthermore, the hollow section 3 may also consist of only one part or of more than two parts. In addition, the reinforcing element 5 could also consist of several parts.

Figure 10:
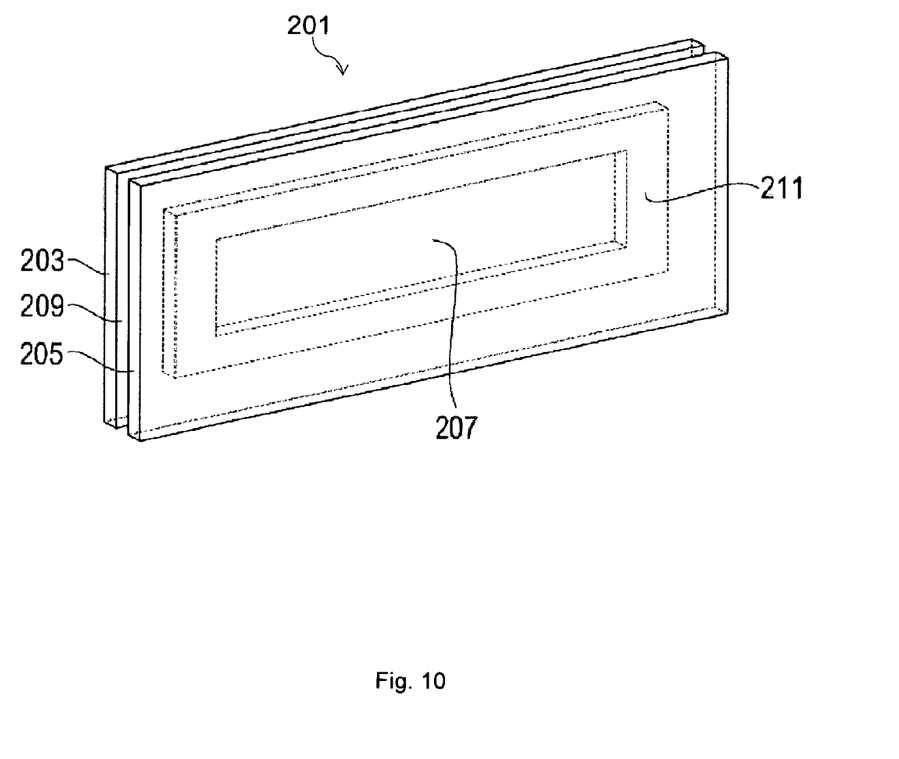
FIG. 10 is a schematic perspective view of a composite component according to a second embodiment of the present invention.

In particular, according to a second embodiment of the present invention, which is illustrated in FIG. 10, two plate-shaped component elements 203 and 205 can also be mutually connected into one composite component 201 by means of the process according to the invention.

By means of its adhesive connection side, the first plate-shaped component element 203 is arranged opposite an adhesive connection side of a second plate-shaped component element 205, a gap 209 being formed between the first component element 203 and the second component element 205.

In the gap 209, an adhesive cavity 207 is formed which is bounded by the adhesive connection side of the first plate-shaped component element 203 and the adhesive connection side of the second plate-shaped element 205 as well as by a wall made of a thermally activated plastic material 211. The wall has the shape of a closed rectangle. Naturally, other formations of the wall are conceivable. The wall extends over the entire width of the gap 209 between the first plate-shaped component element 203 and the second plate-shaped component element 205.

The adhesive cavity 207 is filled with an adhesive, which establishes a permanent connection between the first and the second component element 203 and 205.

A process for producing the composite component 201 according to the second embodiment operates analogously to the process for producing the composite component 1 of the first embodiment, so that it will not be further explained here. In contrast, in the case of the composite component 201, the first and the second component element 203 and 205 are not arranged in one another but rather on one another, and the first component element 203 consists of only one component and not of two components as in the case of the first embodiment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for producing a composite component having a first component element and a second component element, the first and second component elements being mutually connected by an adhesive connection, the process comprising the acts of:
    forming a locally limited adhesive cavity having a limited axial extent relative to an axial extent of the first and second component elements by:
        (i) applying a thermally active plastic material to an adhesive connection side of the first component element and/or to an adhesive connection side of the second component element, the applied thermally active plastic material being applied about a whole circumference of the adhesive connection side at two locations spaced axially apart from one another;
        (ii) arranging the first component element and the second component element opposite and spaced apart from one another, wherein a gap is formed between the adhesive connection side of the first component element and the adhesive connection side of the second component element; and
        (iii) supplying heat to expand the thermally active plastic material to form boundaries in the gap between the first component element and the second component element at the two locations, wherein the locally limited adhesive cavity is formed by the gap between the boundaries at the two locations such that the locally limited adhesive cavity has the limited axial extent relative to the axial extent of the first and second component elements; and
    filling the formed locally limited adhesive cavity with adhesive to adhere the first component element with the second component element, the adhesive completely filling the gap between the boundaries.

2. The process according to claim 1, wherein
    the first component element is formed of a first material,
    the second component element is formed of a second material, and
    the first material and the second material have different thermal coefficients of linear expansion.

3. The process according to claim 2, wherein the first material is a plastic material and the second material is a metallic material.

4. The process according to claim 3, wherein the plastic material is a fiber-reinforced plastic material.

5. The process according to claim 1, wherein
    the thermally active plastic material is applied so as to form a closed boundary in the gap at least after the heat is supplied.

6. The process according to claim 1, wherein the act of supplying heat further comprises an act of coating the composite component with a coating.

7. The process according to claim 6, wherein during the act of coating the composite component, the process further comprises the act of drying the coating, wherein process heat for the drying of the coating supplies the heat to expand the thermally active plastic material.

8. The process according to claim 7, wherein the act of coating is a dip painting process.

9. The process according to claim 1, wherein the first component element is a hollow sectioned element and the second component element is a reinforcing element, the process further comprising the acts of:
    arranging the reinforcing element inside the hollow section element; and
    during the forming of the adhesive cavity, applying the thermally active plastic material to an exterior side of the reinforcing element and/or to an interior side of the hollow section element.

10. The process according to claim 9, wherein the hollow section element comprises a first hollow-section component and a second hollow-section component.

11. The process according to claim 10, wherein
    during the arranging of the reinforcing element inside the hollow section element, the reinforcing element is first arranged in the first hollow-section component, and then the first hollow-section component is connected with the second hollow-section component.

12. The process according to claim 1, wherein the composite component is a support part of a motor vehicle body.

13. The process according to claim 1, wherein multiple locally limited adhesive cavities are formed in the gap between the first component element and the second component element, whereby multiple locally limited adhesive connections are made within the gap between the first component element and the second component element.

* * * * *